United States Patent
Reinhart et al.

(10) Patent No.: US 8,523,720 B2
(45) Date of Patent: Sep. 3, 2013

(54) CHAIN TENSIONER

(75) Inventors: Paul T. Reinhart, Livonia, MI (US); Kenneth Steven Fedeson, Farmington Hills, MI (US); Christopher David Tiernan, Wixon, MI (US); Joseph Jouraij, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 755 days.

(21) Appl. No.: 12/496,801

(22) Filed: Jul. 2, 2009

(65) Prior Publication Data
US 2011/0003657 A1   Jan. 6, 2011

(51) Int. Cl.
*F16H 7/08* (2006.01)
*B23P 11/00* (2006.01)

(52) U.S. Cl.
USPC ........................................ 474/110; 29/525.01

(58) Field of Classification Search
USPC ................. 474/109, 110, 111, 100, 101, 140; 29/525.01
See application file for complete search history.

(56) References Cited

U.S. PATENT DOCUMENTS

| | | | |
|---|---|---|---|
| 4,894,047 A * | 1/1990 | Breon et al. | 474/110 |
| 5,055,088 A | 10/1991 | Cradduck et al. | |
| 5,711,732 A | 1/1998 | Ferenc et al. | |
| 5,782,625 A | 7/1998 | Young | |
| 5,989,139 A * | 11/1999 | Dusinberre et al. | 474/110 |
| 5,993,342 A * | 11/1999 | Wigsten et al. | 474/110 |
| 6,406,391 B1 | 6/2002 | Ullein | |
| 6,685,587 B2 | 2/2004 | Rossato et al. | |
| 6,945,889 B2 * | 9/2005 | Markley et al. | 474/110 |
| 6,955,621 B2 | 10/2005 | Wigsten et al. | |
| 7,507,172 B2 * | 3/2009 | Lehtovaara et al. | 474/109 |

FOREIGN PATENT DOCUMENTS

EP    0877180 B1    1/2003

* cited by examiner

*Primary Examiner* — William E Dondero
*Assistant Examiner* — Robert T Reese
(74) *Attorney, Agent, or Firm* — Julia Voutyras; Brooks Kushman, P.C.

(57) ABSTRACT

A chain tensioner for use on a chain drive system is disclosed which has a housing open at both ends. Into the housing, a cartridge is inserted, the cartridge having including a body with a cylinder within and a piston. A retention system is provided to substantially prevent the body of the cartridge from moving with respect to the housing. Such a retention system, in one embodiment, includes a lip at a first end of the body and a groove on a second end of the body. The lip serves as a stop to prevent the body of the cartridge from moving axially beyond the stop in one direction. A clip is interlocked into the groove on the second end of the body of the cartridge to prevent movement in the opposite direction.

20 Claims, 6 Drawing Sheets

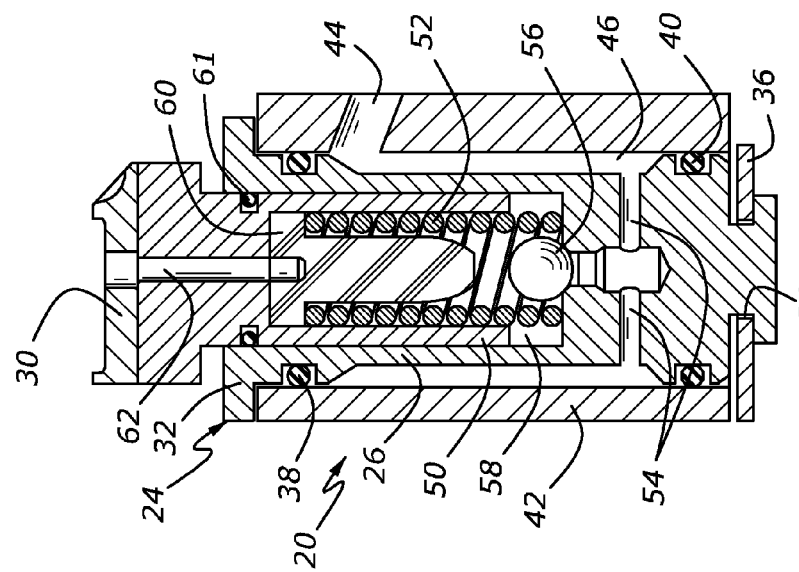
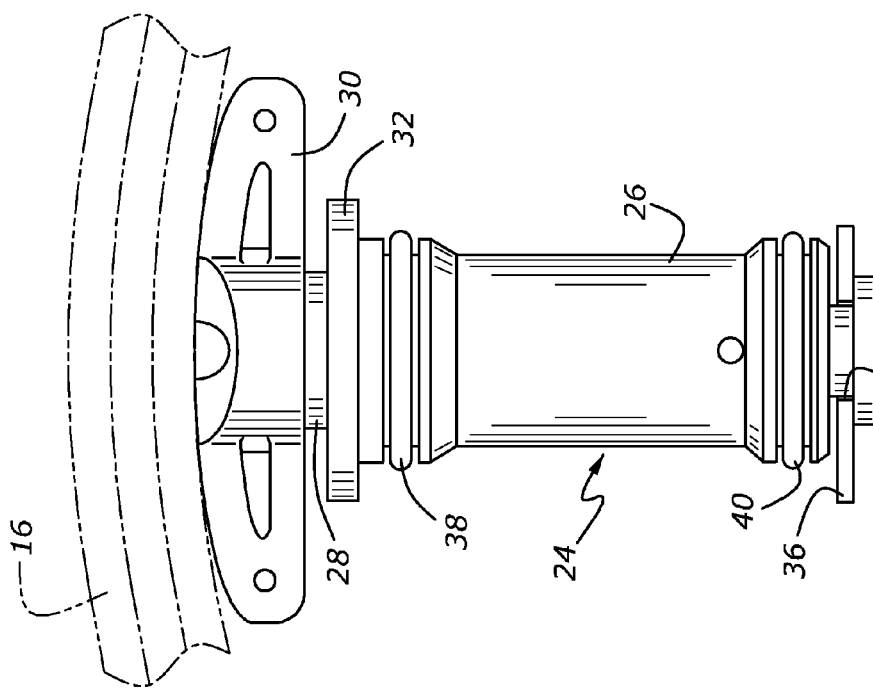
Figure 4
Figure 3

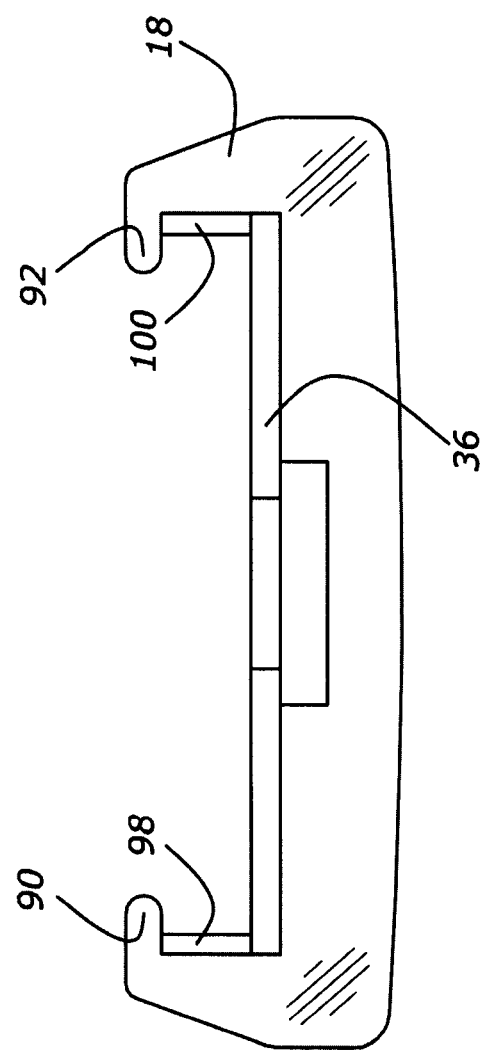

CHAIN TENSIONER

BACKGROUND

1. Technical Field

The present development pertains to chain tensioners used in chain drive systems.

2. Background Art

It is known in the prior art to drive auxiliary components of an engine system by a chain or belt driven off of a crankshaft or other driving sprocket. To accommodate slack in the chain due to momentary changes in torque requirements of the various components and changes in system tension due to stretching of the chain with aging, it is known to provide a chain tensioner to take up the slack. Consequently, a relatively constant tension in the chain is maintained regardless of operating condition and/or state of wear of the chain.

One type of chain tensioner cartridge 1 is shown in FIG. 1 which has a cartridge body 2 having a hollow cylinder within and a piston 3 which can move axially in the cylinder. Cartridge 1 is intended to be mounted proximate a belt drive system on an internal combustion engine or other energy conversion unit. To engage with such an energy conversion unit, external threads 4 are provided on the outer surface of cartridge 1 which engage with a threaded housing mounted on the energy conversion unit (not shown). Cartridge body 2 remains fixed with respect to the energy conversion unit. The length of chain tensioner 1 is determined by the position of piston 3 with respect to element 2. A spring 5 applies a force on piston 3. Additionally, hydraulic pressure acts on piston 3 when oil passage 6 is supplied a pressurized fluid supply, typically from an engine's lubricant supply. Oil passage 6 is coupled to a cavity 7 between cartridge body 2 and piston 3 via a check valve 8. The mechanical spring force and the hydraulic force are balanced against a chain 9 riding against piston 3. When there is slack, the forces push piston 3 upward which causes a bow in chain 9 riding on piston 3 and thus the slack is taken up. When there is an increased tension in chain 9 due to, for example, a rapidly changing engine speed, the force that chain 9 exerts on piston 3 causes piston 3 to retreat into cartridge body 2 to establish a new equilibrium of forces, i.e., the force of the chain balances spring and hydraulic forces. In FIG. 1, chain 9 rides directly on piston 3. This is one alternative. In many applications, piston 3 presses directly against a tensioning arm, which presses into the chain. Or, in other applications, a shoe is applied to piston 3 with the chain riding on the shoe.

Cartridge 2 mounts into a threaded housing on an energy conversion unit by engaging with threads 4. In some applications, finding space to package the mating thread set presents a challenge. Furthermore, with such a design, there must be space to rotate the cartridge 2 with respect to the energy conversion unit both during an initial build and during repair and replacement operations. There is a cost associated with machining threads on the outer surface of cartridge 2 and the mating internal threads on the power conversion unit. An alternative mounting system obviating the need for a threaded connection is desired.

SUMMARY

A chain tensioner is disclosed which has a housing open at both ends. Into the housing, a cartridge is inserted having a lip extending outwardly at a first end and a groove on a second end. The lip serves as an axial stop to prevent the cartridge from moving beyond the lip in a first direction. A clip is interlocked into the groove on the second end of the cartridge. With the clip installed, the cartridge is fixed in the housing such that it is substantially prevented from moving axially with respect to the housing or moving only an amount of a clearance in the system.

The cartridge includes a body having a cylinder inside and a piston within the cylinder. It is the body portion of the cartridge that has the lip and the groove for the clip. The body doesn't move with respect to the housing. However, the piston is able to freely move within the cylinder inside the body.

The piston is forced partially out of the cylinder, i.e., lengthening of the cartridge, under a spring force and/or hydraulic pressure. In one embodiment, a spring is installed in the cartridge forcing the piston in a direction to lengthen the cartridge. In another embodiment, an oil passageway through the housing fluidly connects an engine oil system to a cavity adjacent to the piston. When the chain tensioner is installed on an engine and supplied pressurized oil from the engine, the piston is forced in a direction which lengthens the cartridge. When the cartridge lengthens, the piston or a shoe coupled to the piston pushes on a chain of a drive system to increase tension in the chain drive. When the cartridge shortens, the tension in the chain drive is decreased.

In one embodiment, a shoe for riding on the chain is affixed to the piston near the first end. In another embodiment, the body of the chain tensioner has tabs near the second end for engaging with a shoe, the shoe having arms to interlock with tabs extending outwardly from the housing. In yet another embodiment, a first shoe is affixed to the piston and a second shoe engages with tabs on the housing. In such an embodiment, the chain tensioner has shoes on both ends.

Also disclosed is a method to assemble a chain tensioner, which includes inserting a chain tensioner cartridge into a housing. The cartridge has a lip extending outwardly at a first end of the cartridge and a groove in the cartridge at a second end of the cartridge. The method also includes sliding a clip into the groove to secure the cartridge within the housing. In one embodiment, a housing of the chain tensioner has tabs extending outwardly proximate the second end. An outer periphery of a clip engages with a groove in a shoe prior to being assembled with the housing and cartridge. An inner portion of the clip engages with the groove on the cartridge and arms on the shoe interlock with the tabs on the housing substantially simultaneously during assembly of the shoe and clip.

A chain tensioner is also disclosed which has a housing defining a cylinder, a chain tensioner cartridge installed in the cylinder, and a retention system coupled to a body of the chain tensioner cartridge wherein the retention system substantially prevents movement of the body of the cartridge with respect to the housing. In one embodiment, the retention system includes a lip on one end of the body, a groove in the other end of the body, and a clip engaged with the groove.

An advantage of the disclosed chain tensioner is that by restraining the cartridge body by lip on one end and a clip at the other end, no threads on the cartridge body are necessary thereby limiting machining operations, reducing cost, and simplifying installation of the cartridge in the housing.

Because the cartridge is restrained in one direction by the lip and in the other direction by a clip, the cartridge body is prevented from moving in an axial direction. Such restraint is possible by providing a cartridge body which is open at both ends. Due to dynamic conditions during operation, the tension in the chain may change more rapidly than the piston can accommodate, in which case the cartridge body moves upward with respect to housing when tension is low and downward when tension is high. Such vertical oscillations may cause damage to the housing and the cartridge body thereby reducing the chain and chain tensioner's operating life and may cause noise and vibration. Because the disclosed cartridge retention system secures the cartridge from moving in either axial direction, such vertical oscillations are prevented, thereby preventing premature failure of the chain tensioner system.

BRIEF DESCRIPTION OF THE DRAWINGS

FIG. 3 is a detail drawing of a portion of a chain tensioner such as shown in FIG. 2;

FIG. 4 is a cross section of a chain tensioner such as shown in FIG. 2;

FIG. 8 is a front view of shoe and clip of FIG. 7.

DETAILED DESCRIPTION

As those of ordinary skill in the art will understand, various features of the embodiments illustrated and described with reference to any one of the figures may be combined with features illustrated in one or more other figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations. Those of ordinary skill in the art may recognize similar applications or implementations whether or not explicitly described or illustrated.

Figure 1:
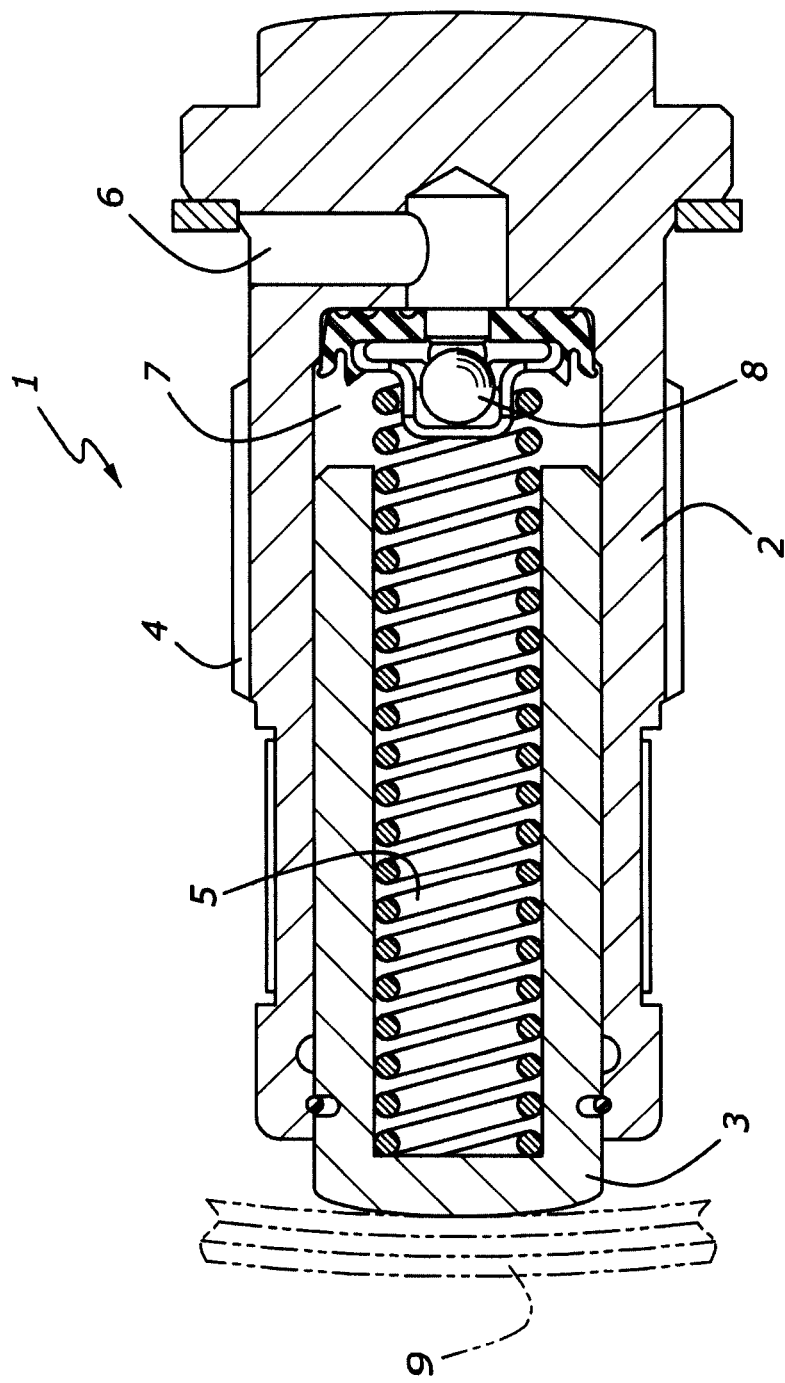
FIG. 1 is a cross-sectional view of a chain tensioner according to the prior art.
Figure 2:
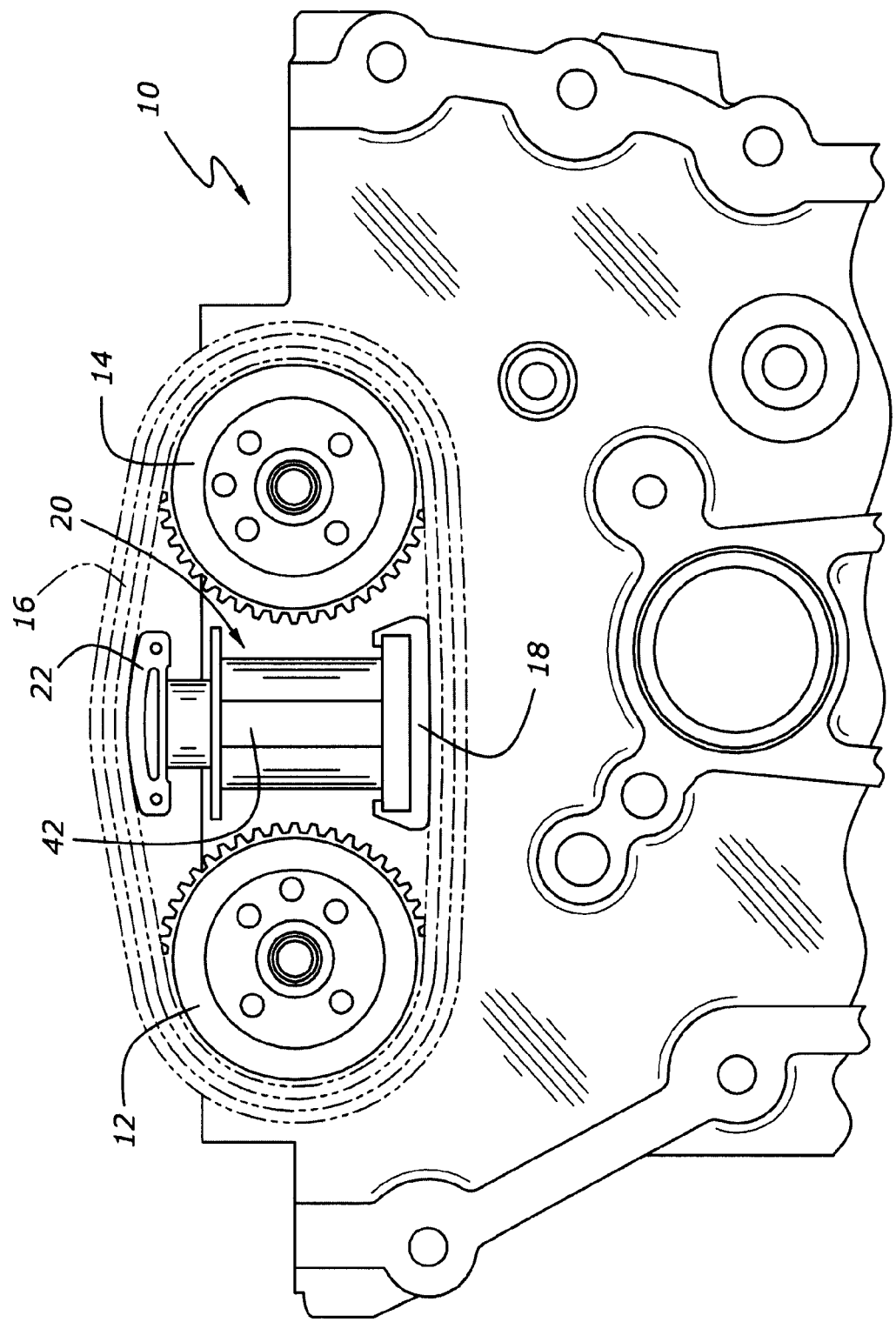
FIG. 2 is a front view of a portion of a partially-assembled internal combustion engine illustrating a chain tensioner in accordance with an embodiment of the present disclosure.

A view of a partially-assembled internal-combustion engine 10 is shown in FIG. 2. A first cam sprocket 12 and a second cam sprocket 14 are coupled together by a chain 16. Chain 16 rides on a first shoe 18. A chain tensioner 20 has a second shoe 22 on which chain 16 also rides. As will be describe in more detail below, first shoe 18 does not move against chain 16 and as such, does not adjust chain tension. Instead, shoe 18 acts as a chain guide. Shoe 18 causes chain 16 to bow out a small amount so that chain 16 must ride on shoe 18. This prevents resonant frequencies being set up in the chain. Within chain tensioner 20 is a piston-cylinder arrangement (not shown here, but discussed below in regard to FIG. 4) which is coupled to the engine's pressurized lubrication system. By virtue of pressurized oil acting on the piston, second shoe 22 exerts an upward force on chain 16. It is the action of second shoe 22 that modifies the chain tension in the system.

In FIG. 3, a chain tensioner cartridge 24, which is a portion of chain tensioner 20, is shown. Body 26 defines a hydraulic cylinder within which piston 28 may slide. At one end of piston 28, a shoe 30 is affixed. Shoe 30 may be integrally formed or attached to piston 28 in any manner known to one skilled in the art. A portion of chain 16 is proximate shoe 30. Shoe 30 provides a wear surface for chain 16 to ride upon in operation. In an alternative embodiment discussed below, piston 28 is not coupled to a shoe, in which case chain 16 rides on piston 28. Cartridge 24 is slipped into a housing (shown as element 42 in FIG. 2) to form chain tensioner 20. So that cartridge 24 moves minimally, or not at all, with respect to the housing, a lip 32 is provided at one end of body 26 of cartridge 24. The outside dimensions of lip 32 and the inside dimensions of the housing are such that lip 32 cannot enter the housing. Lip 32 serves as a stop in a first axial direction for relative motion between the housing and body 26 (such stopping function is apparent in FIG. 4). To prevent relative motion in a second axial direction with respect to the housing, a groove 34 is formed in body 26 of cartridge 24 into which a clip 36 is inserted. To facilitate assembly of the cartridge into the housing, clip 36 is uninstalled to allow cartridge 24 to slide into the housing. Then, clip 36 is engaged into groove 34. The outside dimensions of clip 36 are such that clip 36 serves as a stop to prevent movement of cartridge 24 with respect to the housing in the second axial direction (illustrated in FIG. 4).

In FIG. 4, a cross section of chain tensioner 20 is shown having a housing 42 in which cartridge 24 is installed. Body 26 of cartridge 24 is held in place by lip 32 and clip 36 fitting into groove 34. Oil is supplied to chain tensioner 20 via an oil passage 44 through housing 42. In one embodiment, housing 42 is integrally cast with a component of engine 10 thereby ensuring housing 42 is affixed to engine 10 in a desired orientation. Alternatively, housing 42 is attached to engine 10 by bolts, a bracket, or any other manner known to one skilled in the art. Oil passage 44 is coupled to the pressurized oil supply within engine 10. Without departing from the spirit of the disclosure, any other pressurized fluid may be supplied to chain tensioner 20 from other sources. Oil passage 44 leads to an annular oil cavity 46 between housing 42 and cartridge 24. Pressure in annular oil cavity 46 is maintained between housing 42 and body 26 of cartridge 24 by O-rings 38 and 40, which are fitted into grooves in the outside surface of body 26. Body 26 forms a hydraulic cylinder 48 within which a piston 50 can slide. Piston 50 is acted upon by a spring 52 and by hydraulic pressure: oil from cavity 46 going through radial passageways 54 and then past a check ball 56 into internal cavity 58. Pressurized oil in internal cavity 58 acts upon a resilient member 60 affixed to piston 50. Piston 50 can move relative to body 26, with O-ring (or other type of seal) 61 to prevent oil leakage between piston 50 and body 26. In the embodiment shown in FIG. 4, an oil passage 62 passes through the top of piston 50 and through shoe 30. (The view shown in FIG. 4 is rotated 90 degrees with respect to the view shown in FIG. 3; thus, the arms of the shoe are not visible in this cross-sectional view). The oil through passage 62 provides lubrication for the interface between the shoe 30 and the chain (not shown).

Figure 5:
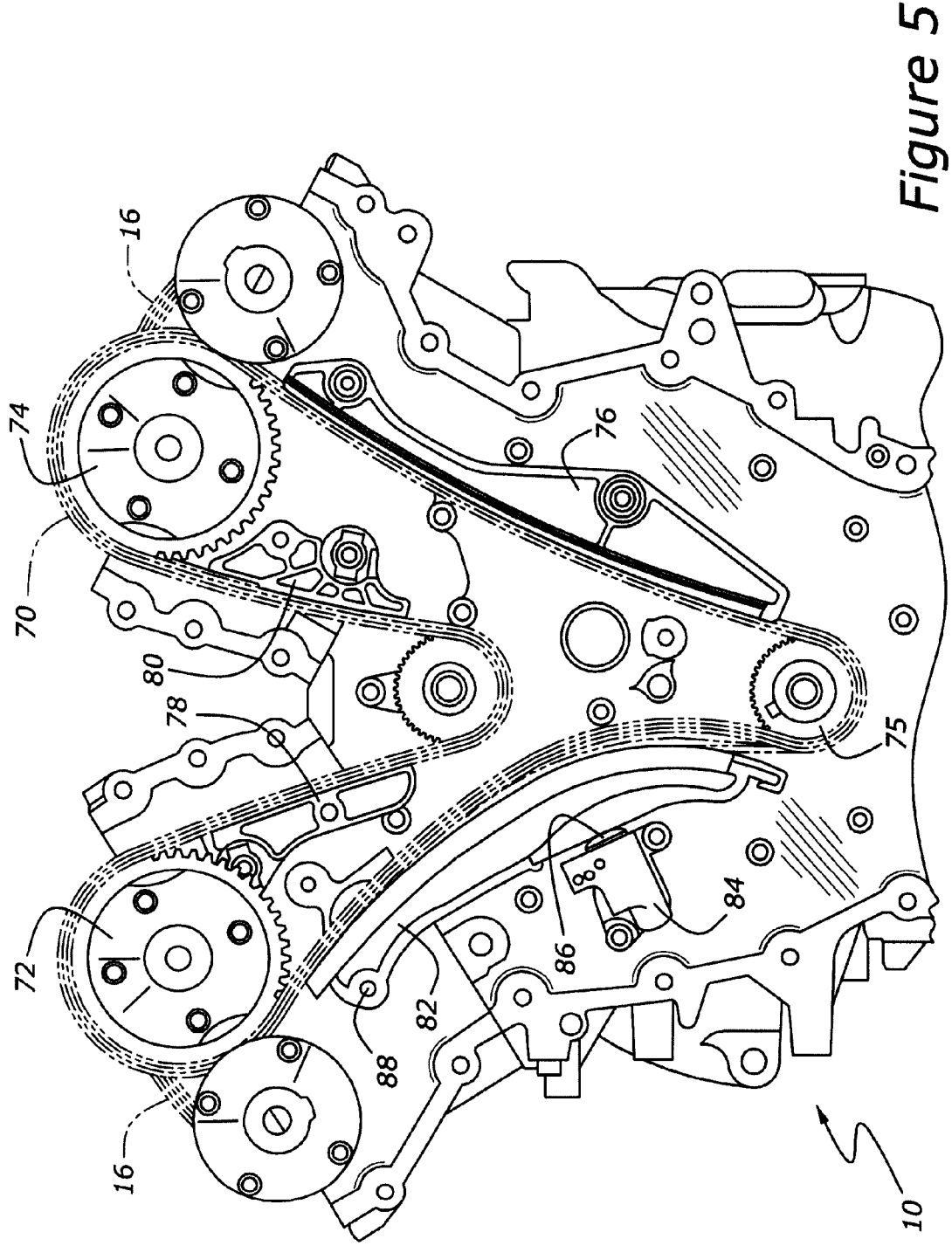
FIG. 5 is a front view of a portion of a partially-assembled internal combustion engine shown in a more assembled condition than FIG. 2.

As shown in FIG. 2, chain tensioner 20 includes second shoe 22 and is interlocked with first shoe 18 and is disposed between two portions of chain 16. An alternative chain configuration is shown in FIG. 5 in which partially-assembled, V-configured engine 10 is shown in a different stage of assembly than that shown in FIG. 2. Both FIGS. 2 and 5 show the engine without the front cover installed. Chain 70 follows a serpentine path and engages with: cam sprockets 72 and 74; driving sprocket 75 coupled to the engine's crankshaft; chain guides 76, 78, and 80; and tensioner arm 82. A housing of chain tensioner 84 is affixed to engine 10. A piston 86 of chain tensioner 84 presses against tensioner arm 82 during engine operation (under lubricating oil pressure). Tensioner arm is affixed to engine 10 at one location 88, a pivot point. Thus, when piston 86 of chain tensioner 84 causes tensioner arm 82 to rotate about pivot point 88, tensioner arm 82 applies appropriate tension in chain 70. Chain 16, which is shown in more detail in FIG. 2, is partially shown in FIG. 5. FIG. 5 shoes two chains 16; one chain provided on each bank of V-configured engine 10.

Figure 6:
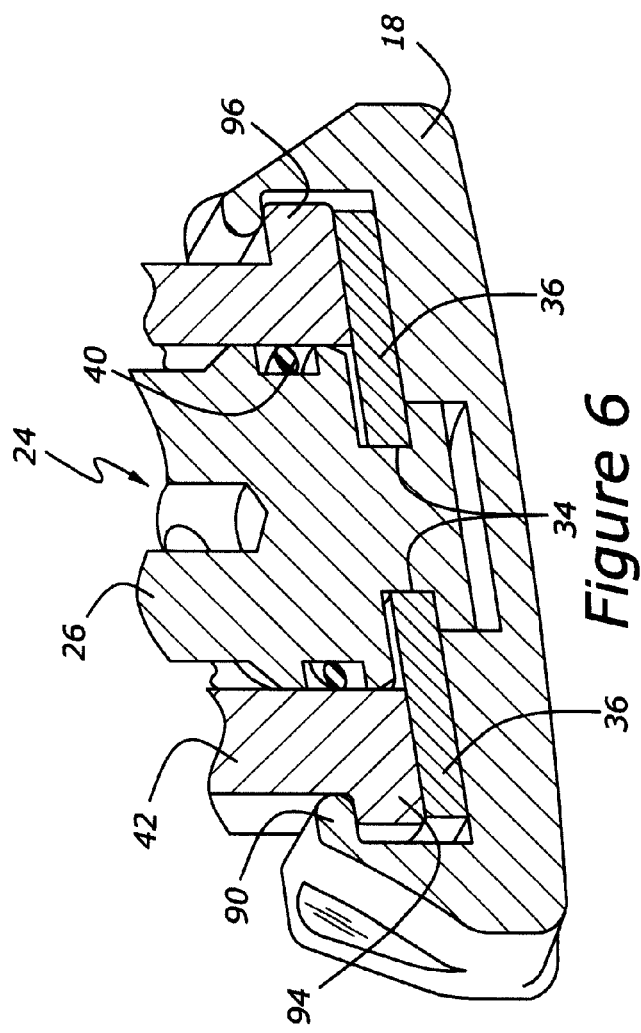
FIG. 6 is cross section of a detail of a chain tensioner with a shoe assembled on the clip end of chain tensioner such as shown in FIG. 2.

In FIG. 6 a detail of the lower portion of cartridge 24 is shown in cross section. Cartridge 24 is contained within housing 42 and sealed by O-ring 40. Clip 36 inserted into groove 34 is wider than the cylindrical opening in housing 42 preventing upward movement of cartridge 24 with respect to housing 42. Arms 90 and 92 of shoe 18 interlock with tabs 94 and 96 of housing 42. In the embodiment shown in FIG. 6, interlocking tabs/arms are shown diametrically opposed to each other. In another embodiment, a single tab extending around about half of the circumference is provided. These are non-limiting examples; any known method to lock shoe 18 to body 42 can be employed. In FIG. 6, clip 36 is a separate piece from shoe 18. Clip 36 may be integrally formed with shoe 18, according to one alternative.

Figure 7:
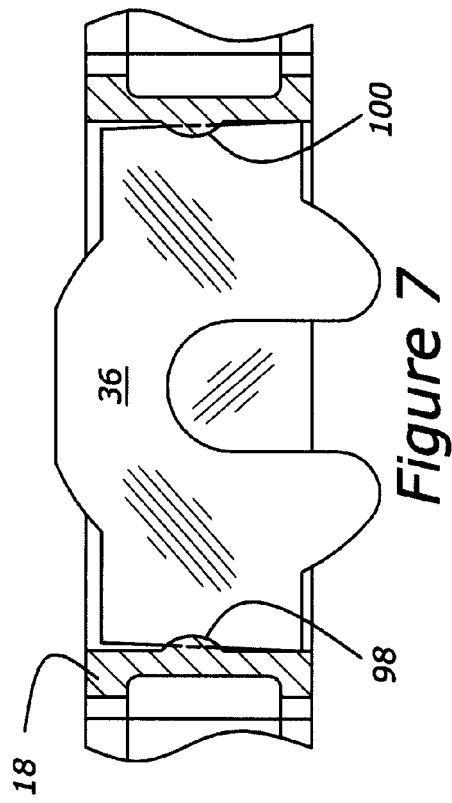
FIG. 7 is cross-sectional top view of a shoe with a clip engaged according to an embodiment of the present disclosure.

In FIG. 7, a top view of shoe 18 is shown in cross section with clip 36. Shoe 18 has tabs 98 and 100. Clip 36 is partially retained by tabs 98 and 100 which are part of shoe 18. This is also shown in an alternate view in FIG. 8 in which clip 36 slides under tabs 98 and 100 which extend from inner walls of shoe 18. But because tabs 98 and 100 don't extend down to meet the horizontal surface of shoe 18, this provides a groove into which clip 36 can be slid. Tabs 98 and 100, in one embodiment, engage with mating detents (not shown) in the outside surface of housing 42 (shown in at least FIGS. 4 and 6). In FIGS. 7 and 8, clip 36 can be removed from shoe 18. In an alternate embodiment, clip 36 can be affixed to shoe 18 by adhesives or mechanical connectors in any known manner.

While the best mode has been described in detail with respect to particular embodiments, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The present disclosure, although described as applied to an internal combustion engine, can be applied to any known chain drive system in which chain tensioning is desired. The present disclosure applies to systems that act on the piston by spring force only, hydraulic force only, combined spring/hydraulic, and another manner known to one skilled in the art. Depending on the application, the piston acts on a chain tensioner arm, the piston acts on the chain directly, and the piston is affixed to a shoe which acts on the chain. Also depending on the application, the stationary end of the chain tensioner acts as a chain guide and may be provided with a shoe. In other applications, the stationary end does not contact the chain. The embodiments described herein that are characterized as less desirable than other embodiments or prior art implementations with respect to one or more characteristics are not outside the scope of the disclosure and may be desirable for particular applications.

What is claimed:
1. A chain tensioner, comprising:
    a housing defining a cylindrical cavity, the cavity having opposed first and second ends, the first and second ends each having an opening sized to accommodate a chain tensioner cartridge;
    a chain tensioner cartridge installed in the housing, the cartridge having a portion configured to cooperate with a chain to apply tension to the chain, the cartridge having a lip extending outwardly at a first end and a groove in the outer surface at a second end, the lip abutting the housing proximate the first end thereby preventing axial movement of the cartridge in a first axial direction; and
    a clip interlocked with the groove and sized to prevent it from entering the housing thereby preventing axial movement of the cartridge in a second axial direction.
2. The chain tensioner of claim 1 wherein the housing has tabs extending outwardly, the tabs being proximate the second end, the chain tensioner further comprising:
    a shoe having arms interlocked with the tabs of the housing, the shoe providing a wear surface adapted to cooperate with the chain.
3. The chain tensioner of claim 2 wherein the clip is integrally formed with the shoe.
4. The chain tensioner of claim 1, further comprising: a shoe affixed to the cartridge at the first end of the cartridge, the shoe providing a wear surface which is adapted to cooperate with the chain.
5. The chain tensioner of claim 1 wherein the cartridge further comprises:
    a body defining an internal hydraulic cylinder with the lip and the groove formed in the body; and
    a piston installed within the hydraulic cylinder, the piston configured to apply an axial force on the chain when acted upon by a hydraulic pressure.
6. The chain tensioner of claim 5, further comprising: a shoe affixed to the piston, the shoe providing a wear surface adapted to cooperate with the chain.
7. The chain tensioner of claim 5, further comprising: an oil passageway through the housing, the oil passageway being fluidly coupled to the piston, adapted such that when pressurized oil is provided to the oil passageway, a force is exerted on the piston.
8. The chain tensioner of claim 5 wherein the housing has two tabs extending outwardly, the two tabs being proximate the second end, the chain tensioner further comprising:
    a first shoe affixed to the piston;
    a second shoe having two arms, the arms adapted to engage with the two tabs of the housing, the first and second shoes providing a wear surface which are adapted to cooperate with the chain.
9. The chain tensioner of claim 8 wherein the chain tensioner is adapted to be mounted on an internal combustion engine, the housing being affixed to the engine and having an oil passageway coupling a lubrication system of the engine and the piston, the second shoe remaining stationary with respect to the housing, and the first shoe capable of moving along an axis of the housing in response to lubrication system pressure applied to the piston.
10. The chain tensioner of claim 1 wherein the chain tensioner is adapted to be mounted on an internal combustion engine and the housing is affixed to the internal combustion engine by being integrally cast with an engine component or being rigidly coupled to the engine.
11. A chain tensioner comprising:
    a housing defining a hollow cylinder having opposing first and second ends, with openings sized to accommodate a chain tensioner cartridge; the chain tensioner cartridge having a body installed in the housing; and a retention system including a lip on the first end, a groove on the second end, and a clip engaged with the groove, the retention system substantially preventing axial movement of the cartridge body relative to the housing.

12. The chain tensioner of claim 11 wherein the lip abuts the housing to prevent a body of the cartridge from moving with respect to the housing in a first axial direction and the clip abuts the housing to prevent movement of the body of the cartridge with respect to the housing in a second axial direction.

13. The chain tensioner of claim 11 wherein the cartridge comprises:

the body defining a hydraulic cylinder therein; and a piston adapted to move axially in the hydraulic cylinder and to cooperate with the chain to provide tension in the chain.

14. The chain tensioner of claim 13, further comprising: a shoe affixed to the piston, the shoe adapted to provide a wear surface for the chain to ride upon.

15. The chain tensioner of claim 14 wherein the chain tensioner is mounted on an internal combustion engine having accessories driven via a chain drive, the cartridge is coupled to a lubrication system of the engine, and a chain of the chain drive rides on the shoe such that in operation, pressure from the lubrication system acts on the piston causing the piston to move out of the hydraulic cylinder thereby forcing the shoe against the chain and applying a tension in the chain.

16. The chain tensioner of claim 13, wherein the chain tensioner is adapted to be affixed to an internal combustion engine, the engine having a chain drive system comprising:

a driving sprocket;

a driven sprocket;

a chain engaging with the driving and driven sprocket;

a tensioner arm affixed to the engine in one location with the chain riding on the tensioner arm and the piston of the chain tensioner adapted to exert a force on the tensioner arm when pressure in the hydraulic cylinder acts upon the piston.

17. A method for assembling a chain tensioner, the chain tensioner being configured to cooperate with a chain to apply tension to the chain, comprising:

inserting a chain tensioner cartridge into a housing, the housing defining a housing cylinder with opposed first and second openings each with a diameter greater than a cartridge diameter, wherein the cartridge has a lip at a first end corresponding to the first opening, the lip having a diameter greater than the first opening diameter, and the cartridge has an annular groove in a second end;

inserting a clip into the groove, the clip being larger than the housing cylinder so that the cartridge is retained within the housing when the clip is installed in the groove.

18. The method of claim 17 wherein the cartridge comprises a piston and a hydraulic cylinder and the hydraulic cylinder is held within the housing by the lip at the first end and the clip at the second end.

19. The method of claim 18 wherein the piston is affixed to a first shoe and the housing has tabs extending outwardly proximate the second end, the method further comprising:

interlocking a second shoe having arms with the housing, the arms of the second shoe engaging with the tabs of the housing.

20. The method of claim 17, wherein the housing has tabs extending from an outer surface proximate the second end, the tabs adapted to engage with a shoe and the shoe comprises arms adapted to engage with the tabs and a retainer to engage with the clip, further comprising:

inserting the clip into the retainer of the shoe; and engaging the arms of the shoe with the tabs of the housing.

* * * * *